Dec. 29, 1964  M. V. FRIEDELL  3,162,869
SHOT SPLITTING AND APPLYING TOOL FOR FISHERMEN
Filed May 10, 1963  2 Sheets-Sheet 1
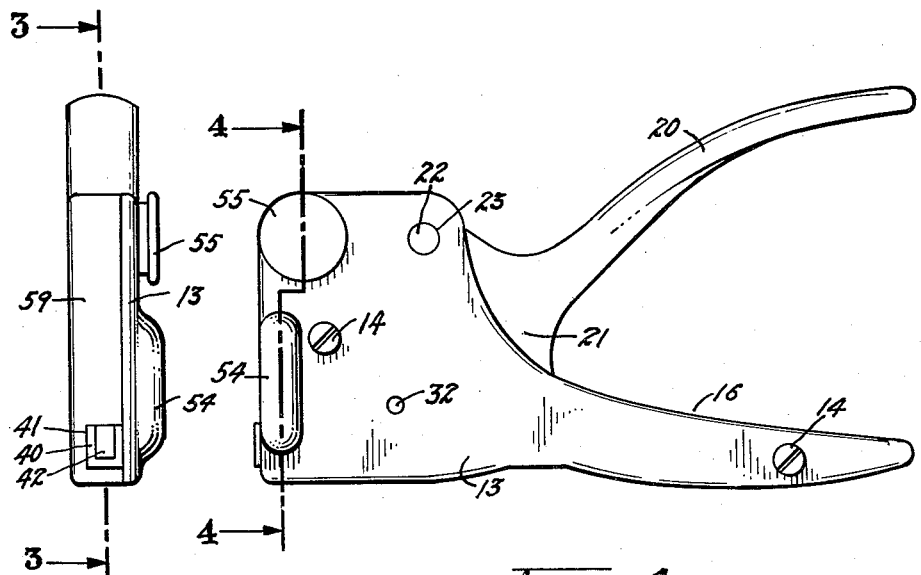
Fig-1
Fig-2
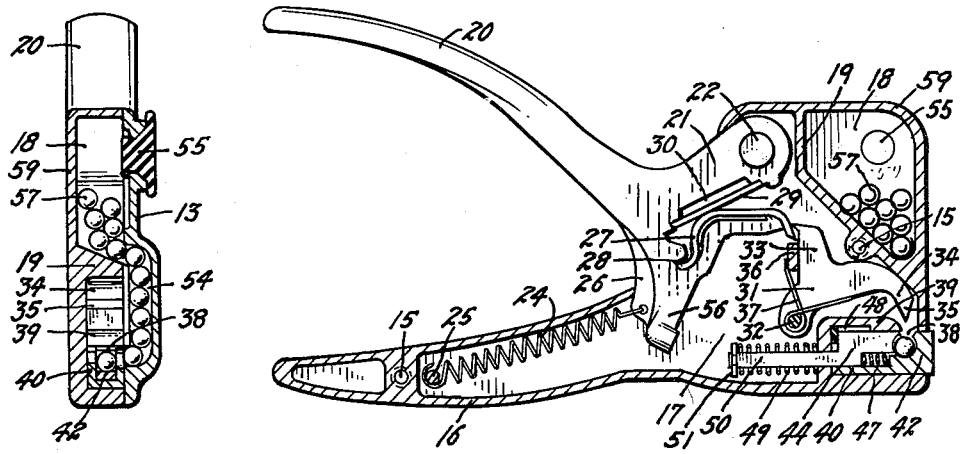
Fig-4
Fig-3
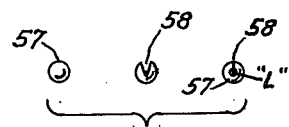
Fig-5
INVENTOR.
MORLEY V. FRIEDELL
BY
ATTORNEY Dec. 29, 1964   M. V. FRIEDELL   3,162,869
SHOT SPLITTING AND APPLYING TOOL FOR FISHERMEN
Filed May 10, 1963   2 Sheets-Sheet 2

INVENTOR.
MORLEY V. FRIEDELL
BY
ATTORNEY

United States Patent Office 3,162,869
Patented Dec. 29, 1964

3,162,869
SHOT SPLITTING AND APPLYING TOOL
FOR FISHERMEN
Morley V. Friedell, Wheat Ridge, Colo., assignor to Clark-Feather Manufacturing Co., Fort Morgan, Colo., a corporation of Colorado
Filed May 10, 1963, Ser. No. 279,501
5 Claims. (Cl. 7—5.4)

This invention relates to a shot splitting and applying tool for fishermen and more particularly to improvements in a shot splitting and applying tool of the type illustrated and described in prior Patent No. 3,070,815.

Lead shot are used by fishermen for weighting a fishing line to facilitate casting of the line and as sinkers for causing the line to sink below the surface of a lake or stream.

Occasionally, ordinary "BB" shot are manually notched or partially split, the line is placed in the split and the latter is closed on the line with the teeth or any convenient tool. Presplit shot are also available for fishermen's use. However, it is often exceedingly difficult to place the shot on the line and to hold it in place, under adverse outdoor conditions, until it can be closed or clamped to the line.

The principal object of this invention is: to incorporate in a single unitary, convenient, highly-efficient tool, means for storing conventional lead shot; means for successively and individually splitting each shot for use; means for holding a split shot in the proper position for receiving a fishing line or leader, and means for tightly closing the split upon the line.

Another object is to so construct the tool that all of the above functions can be quickly and easily carried out with one hand leaving the other hand free for supporting a fishing rod.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a side view of the improved shot splitting and applying tool;

FIG. 2 is a front end view thereof;

FIG. 3 is a longitudinal section taken on the line 3—3, FIG. 2;

FIG. 4 is a cross section taken on the line 4—4, FIG. 2;

FIG. 5 is a diagrammatic view showing the three successive conditions of a shot as it passes through the improved tool;

Figure 9:
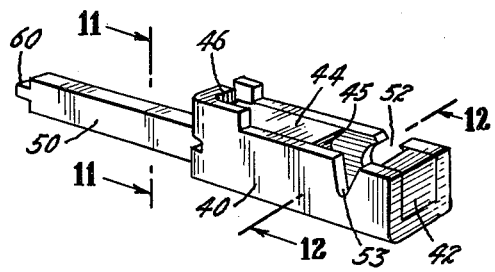
FIG. 9 is a similarly enlarged, detail, perspective view of a slide box, plunger and anvil assembly employed in the tool for delivering and closing the shot.
Figure 10:
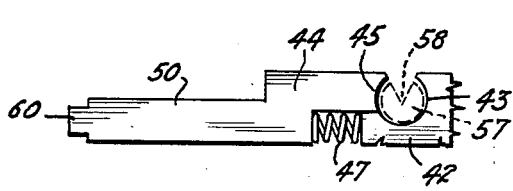
Figure 11:
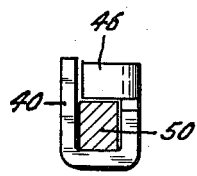
Figure 12:
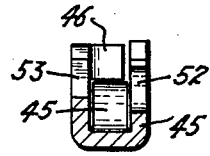

FIG. 10 is an enlarged diagrammetric view illustrating the relative positions of the plunger and anvil as they would appear when delivering a split shot to the line receiving position; and FIGS. 11 and 12 are cross sectional views of the slide box, plunger and anvil assembly taken on the lines 11—11 and 12—12, respectively, of FIG. 9.

Relatively soft lead "BB" shot of the type for which this tool is designed are indicated on the drawing at 57. This tool forms a split 58 in the shot 57 and then closes the split on a line or leader L as illustrated in FIG. 5.

The improved shot splitting and applying tool of this invention is what might be termed a "plier type" tool arranged to be held in the palm of one hand and operated by simply contracting the hand to first form the split 58, then deliver the split shot to a line-receiving position, and then close the split on the fishing line L to retain it in place thereon.

The improved shot storing, splitting and applying tool comprises a body member 59, the left side of which is permanently closed and the right side of which is closed by a cover plate 13 which is removably attached to the body member by means of attachment screws 14 which enter tapped holes 15 in the body member. The body member 59 and its cover plate 13 are similar in shape and, when together, they form a flat, enclosed, hollow housing which extends rearwardly to form a hollow lower handle 16. The body member is cavitated to form a mechanism compartment 17 and shot reservoir 18 separated from each other by an inclined partition 19.

An upper handle 20 is pivotally mounted in the mechanism compartment 17. The upper handle has an enlarged head portion 21 extending rearwardly through a handle opening in the body member which limits the vertical arc of swing of the upper handle 20. The head portion is provided with two oppositely-extending, aligned pivot bosses 22 which rotate in pivot holes 23 formed in the body member 59 and in the cover plate 13 to provide a pivotal connection for the upper handle 20. The upper handle 20 is constantly urged upwardly by means of a tension spring 24 contained within the hollow lower handle 16 and tensioned between a spring pin 25 in the handle and a spring rib 26 formed on the lower extremity of the handle head portion 21. The head portion 21 is formed with a downwardly extending pushing lever 56.

An inverted, U-shaped, leaf-type, pusher spring 27 is positioned in the head portion 21. The rear extremity of the pusher spring 27 is hooked in a retaining notch 28 in the head and the forward extremity depends forwardly and downwardly from the head. The pusher spring 27 is constantly and resiliently retained in its lowermost position and in its retaining notch 28 by a leaf-type retainer spring 29 which extends across a concavity 30 in the head and bears, at its midportion, against the pusher spring 27.

A rocking element 31 is pivotally mounted on a pivot pin 32 mounted in and extending between the body member 59 and the cover plate 13 below and forwardly of the pivot bosses 22. The rocking element 31 is shaped to include an upwardly extending lever arm 33 and a forwardly extending lever arm 34. The latter lever arm terminates in a downwardly extending sharpened, shot-splitting, knife edge 35 which, when the lever arm 34 is swung downwardly, enters a knife opening 38 in the upper wall of a slide chamber 39 formed in the body member 59. The upwardly extending lever arm 33 terminates forwardly of the forward extremity of the pusher spring 27. The lever arm 33 is constantly urged rearwardly against a stop boss 36 by means of a torsion spring 37 which exerts a clamping action between the stop boss 36 and the lever arm 34.

The slide chamber 39 contains a channel-shaped slide box 40 which can be projected forwardly through a rectangular slide opening 41 in the front edge of the body member. The slide box is provided with a shot entrance hole 52 in one side wall and with a line-receiving notch 53 in the opposite side wall. The front extremity of the slide box 40 is closed by an anvil block 42 having a semi-circular, shot-receiving notch 43 in its rear face. The anvil block is preferably formed separately from the slide box and is permanently soldered or welded therein.

A plunger 44 is slidably mounted in the slide box 40 rearwardly of the anvil block 42. The forward extremity of the plunger is formed with a semi-circular, shot-compressing notch 45 which cooperates with the notch 43 in the anvil block to compress the shot 57 therebetween. The plunger 44 is constantly urged rearwardly from the anvil block 42 and against a stop 46 by means of a compression spring 47 positioned in the box 40 between the anvil block 42 and the plunger 44. The stop 46 is preferably formed by bending the rear extremity of one side of the slide box inwardly as shown in FIGS. 9, 11 and 12. The stop 46 projects upwardly above the side walls of the slide box 40 into a movement-limiting groove 48 in the top of the slide chamber 39 to limit the outward and inward movement of the slide box.

The slide box is constantly urged inwardly by a second compression spring 49 which surrounds a plunger stem 50 projecting rearwardly from the plunger 44. The second compression spring is compressed between the slide chamber 39 and a spring washer 51 fixed on a tenon 60 on the rear extremity of the plunger stem 50.

The shot flows from the shot reservoir 18 around the portion 19 and through a protruded shot channel 54 in the cover plate 13 thence through the shot entrance hole 52 in the side of the slide box 40 to a position between the shot-receiving notches 43 and 45. The reservoir 18 is filled with shot through a filler opening in the cover plate 13 closed by a suitable rubber plug 55.

Operation

Let us assume that the reservoir 18 is filled with a plurality of whole shot such as "BB" shot and that it is desired to place one of the shot on a fishing line or leader.

Figure 6:
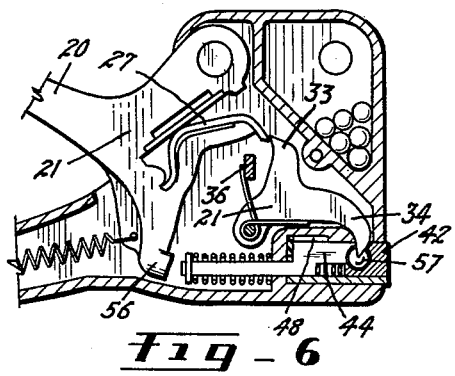
FIGS. 6, 7 and 8 are fragmentary, longitudinal, sections exposing the working mechanism of the improved tool in three successive working positions to be later described.

The handles 16 and 20 are gripped in the hand and compressed together. The initial movement causes the pusher spring 27 to contact and force the upper lever arm 33 forwardly to rotate the rocking member forwardly to force the knife edge 35 into the shot to split the latter as illustrated in FIG. 6.

Figure 7:
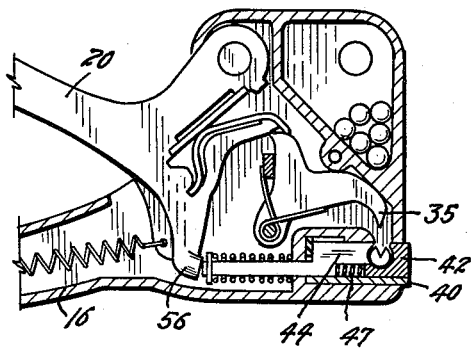

Continued movement causes the pusher spring to snap over the upper extremity of the upper lever arm to allow the torsion spring 37 to return the rocking member to its normal at rest position as shown in FIG. 7.

Figure 8:
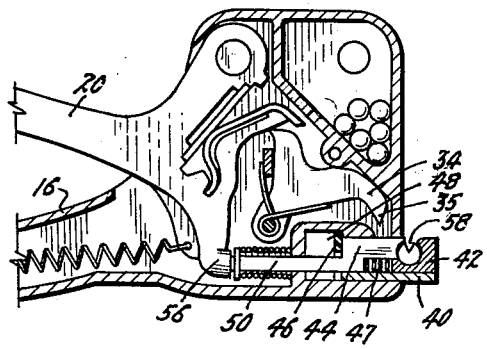

Still further continued movement causes the pushing lever 56 to swing against the plunger stem 50 and push the slide box 40, with the split shot, forwardly to the stopped, projected, position of FIG. 8.

The line or leader is now laid in the split 58 of the shot, the line extending through the entrance hole 52 and the line-receiving notch 53, and the movement is continued to force the plunger 44 forwardly to press the split 58 closed on the line as shown in FIG. 5. The shot is now lifted from the tool, by means of the line and the handles are released to allow the slide box to return and receive the next successive slot.

While a specific form of the invention has been described and illustrated herein, it is to be understood that the same may be varied, within the scope of the appended claims, without departing from the spirit of the invention.

1. A shot splitting and applying tool for fisherman comprising; a hollow body member, a lower handle formed on said body member, an upper handle pivotally mounted in said body member and extending readwardly therefrom and forming with said lower handle a pair of grips, a slide chamber in said body member opening to the front of the latter, a slide box slidable within said slide chamber and projectable through the front opening thereof, an anvil block closing the front of said box, a plunger slidable in said box rearwardly of said anvil block, spring means urging said plunger rearwardly from said anvil block to receive a shot therebetween, second spring means urging said slide box rearwardly in said slide chamber, stop means limiting the forward movement of said slide box, a rocking member pivotally mounted in said body member in the plane of and vertically over said slide chamber, an upper lever arm extending upwardly from said rocking member, a forward lever arm extending forwardly from said rocking member, a knife edge formed on the forward extremity of said forward lever arm positioned over a shot resting in said slide box between said plunger and said anvil block, and means actuated by movement of said upper handle for initially forcing said forward lever arm downwardly to cause said knife edge to split said shot, further movement of said upper handle moving said forward lever arm upwardly away from said shot and forcing said slide box forwardly against said stop means to project said slide box forwardly of said handle housing, and continued handle movement forcing said plunger forwardly toward said anvil block to compress said shot and close the split therein.

2. A shot splitting and applying tools as described in claim 1 in which the last named means includes a plunger stem formed on and projecting rearwardly from said plunger and a pushing lever formed on the forward extremity of said upper handle member and extending downwardly therefrom in the plane of said plunger so as to swing forwardly into contact with said plunger as said upper handle member is urged downwardly.

3. A shot splitting and applying tool as described in claim 1 having a shot reservoir in said hollow body member above said slide chamber and a shot channel from said reservoir to said slide chamber and positioned to deliver a shot between said plunger and said anvil block when the latter are in the rearward separated position.

4. A shot splitting and applying tool as described in claim 2 in which the last named means further includes a pusher element mounted in and extending forwardly of said upper handle member below the pivot of the latter and positioned to engage said upper lever arm to urge the latter forwardly as said upper handle moves downwardly.

5. A shot splitting and applying tool as described in claim 4 in which the pusher element comprises a flexible leaf-type spring arranged to engage said upper lever arm prior to the engagement of said pusher lever with said plunger stem, thence to snap over and release said upper lever arm prior to engagement of said pusher lever with said plunger stem.

References Cited by the Examiner
UNITED STATES PATENTS

| | | |
|---|---|---|
| 571,287 | 11/96 | Ryder _____ 7—5.2 |
| 1,326,820 | 12/19 | Youdelman. |
| 2,985,047 | 5/61 | Van Oort. |
| 3,070,815 | 1/63 | Marr. |

WILLIAM FELDMAN, *Primary Examiner.*